(12) United States Patent
Mizuno et al.

(10) Patent No.: US 7,628,091 B2
(45) Date of Patent: Dec. 8, 2009

(54) COMPOSITE GEAR AND METHOD OF MANUFACTURING THE SAME

(75) Inventors: Yota Mizuno, Toyota (JP); Mitsuyasu Ukita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 499 days.

(21) Appl. No.: 10/590,233

(22) PCT Filed: Feb. 24, 2005

(86) PCT No.: PCT/JP2005/003554

§ 371 (c)(1),
(2), (4) Date: Aug. 22, 2006

(87) PCT Pub. No.: WO2005/083302

PCT Pub. Date: Sep. 9, 2005

(65) Prior Publication Data

US 2007/0180696 A1     Aug. 9, 2007

(30) Foreign Application Priority Data

Feb. 27, 2004     (JP) .............................. 2004-052621

(51) Int. Cl.
*F16H 55/17*     (2006.01)

(52) U.S. Cl. ...................................................... 74/438

(58) Field of Classification Search ................... 74/332, 74/665 S, 665 T, 665 K, 438; 29/893.3, 893.35, 29/558, 56.5

See application file for complete search history.

(56) References Cited

U.S. PATENT DOCUMENTS 4,788,889 A * 12/1988 Davis et al. ................... 74/745

FOREIGN PATENT DOCUMENTS

| JP | 54-121146 | 8/1979 |
|----|-----------|--------|
| JP | 63-034285 | 2/1988 |
| JP | 63-87344  | 6/1988 |
| JP | 1-102558  | 7/1989 |
| JP | 5-19706   | 3/1993 |
| JP | 6-114672  | 4/1994 |

* cited by examiner

*Primary Examiner*—Vicky A Johnson
(74) *Attorney, Agent, or Firm*—Kenyon & Kenyon LLP

(57) ABSTRACT

A composite gear, wherein an external gear and a rotation Support surface are formed on the outer peripheral surface thereof and a first internal gear and a second internal gear are formed on the inner peripheral surface thereof at a predetermined interval in the rotating axis direction. A chuck portion is formed on the inner peripheral surface between the first terminal gear and the second internal gear, and the inner diameter of the chuck portion is smaller than at least one of the diameter of the tip of the first internal gear and the diameter of the tip of the second internal gear.

2 Claims, 6 Drawing Sheets

COMPOSITE GEAR AND METHOD OF MANUFACTURING THE SAME

RELATED APPLICATIONS

This is a 371 application of PCT/JP2005/003554 filed on 24 Feb. 2005, claiming priority to Japanese Application No. 2004-052621 filed on 27 Feb. 2004, the contents of which are incorporated herein by reference.

TECHNICAL FIELD

The present invention relates to a composite gear and method of manufacturing the same, wherein an external gear and a rotation support surface are formed on the outer peripheral surface thereof and a first internal gear and a second internal gear are formed on the inner peripheral surface thereof at a predetermined interval in the rotating axis direction.

BACKGROUND ART

An example of a composite gear wherein an internal gear is formed on the inner peripheral surface thereof and an external gear (convex portion) is formed on the outer peripheral surface thereof is disclosed in Japanese Utility Model Laid-Open Publication No. Sho 63-87344. The composite gear disclosed in Japanese Utility Model Laid-Open Publication No. Sho 63-87344 is used as a ring gear of a planetary gear reduction unit in an engine starting device equipped with the planetary gear reduction unit between a drive shaft and an output rotating shaft. With this type of a composite gear, a rotation support surface which is a surface rotatably supported by a bearing is usually provided on the external peripheral surface thereof.

Also, as another background art, a gear loading device for setting gears on gear processing machines is disclosed in Japanese Patent Laid-Open Publication No. Hei 6-114672.

With a composite gear where an external gear is formed on the outer peripheral surface thereof and an internal gear is formed on the inner peripheral surface thereof, machining of the external gear is implemented with the outside being chucked at the rotation support surface of the outside peripheral surface. However, since the rotation support surface is a surface rotatably supported by a bearing, the rotation support surface needs to be subjected to finishing machining after the external gear is machined. As a result, in the case where the external gears is machined with the outside being chucked at the rotation support surface of the outside peripheral surface, the datum for locating a workpiece during machining of the external gear and that used during machining of the rotation support surface differ. Accordingly, there is a problem that the precision of the external gear is degraded.

The purpose of the present invention is to provide a composite gear and method of manufacturing the same that can improve the precision of the external gear.

DISCLOSURE OF THE INVENTION

In summary, the composite gear according to the present invention is a composite gear, where an external gear and a rotation support surface are formed on the outer peripheral surface thereof and a first internal gear and a second internal gear are formed on the inner peripheral surface thereof at a predetermined interval in the rotating axis direction, a chuck portion is formed on the inner peripheral surface between the first internal gear and the second internal gear, and the inner diameter of the chuck portion is smaller than at least one of the diameter of the tip of the first internal gear and the diameter of the tip of the second internal gear.

According to the present invention, a chuck portion is formed on the inner peripheral surface between the first internal gear and the second internal gear, and the inner diameter of the chuck portion is smaller than at least one of the diameter of the tip of the first internal gear and the diameter of the tip of the second internal gear. This allows machining of the external gear and the rotation support surface with the inside being chucked at the chuck portion formed on the inner peripheral surface. Accordingly, the datum for locating a workpiece during machining of the external gear and that used during machining of the rotation support surface do not differ, and therefore the precision of the external gear is improved according to the present invention.

According to one aspect of the composite gear according to the present invention, the inner diameter of the chuck portion is smaller than the diameter of the tip of the first internal gear and larger than the diameter of the bottom of the second internal gear. This will improve the precision of the second internal gear.

The method of manufacturing the composite gear according to the present invention comprises the processes of machining the inner peripheral surface of the composite gear to form the chuck portion, the first internal gear, and the second internal gear such that the chuck portion is located between the first internal gear and the second internal gear in the rotating axis direction and such that the inner diameter of the chuck portion is smaller than at least one of the diameter of the tip of the first internal gear. and the diameter of the tip of the second internal gear, machining the external gear to form the external gear with the chuck portion being chucked, and machining the rotation support surface with the chuck portion being chucked. This will allow machining of the external gear and the rotation support surface while the inside is being chucked at the chuck portion formed on the inner peripheral surface.

In one aspect of the method of manufacturing the composite gear according the present invention, the process of machining the inner peripheral surface is a process for forming the chuck portion, the first internal gear, and the second internal gear on the inner peripheral surface such that the inner diameter of the chuck portion is smaller than the diameter of the tip of the first internal gear and larger than the diameter of the bottom of the second internal gear. This will allow the second internal gear to be formed by broaching.

BEST MODE FOR CARRYING OUT THE INVENTION

Figure 1:
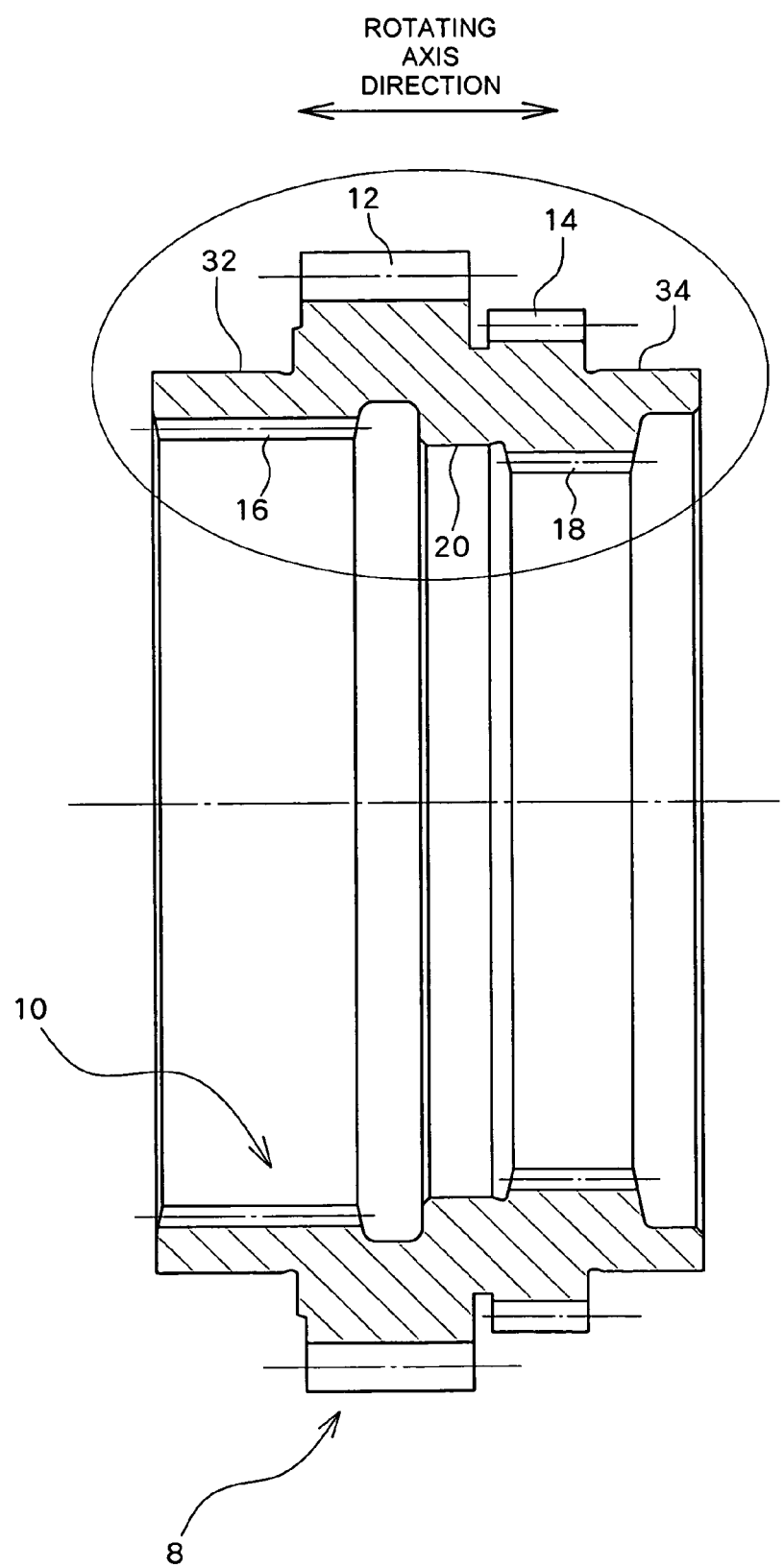
FIG. 1 is a sectional view of the outline of the configuration of the composite gear according to the embodiment of the present invention.
Figure 2:
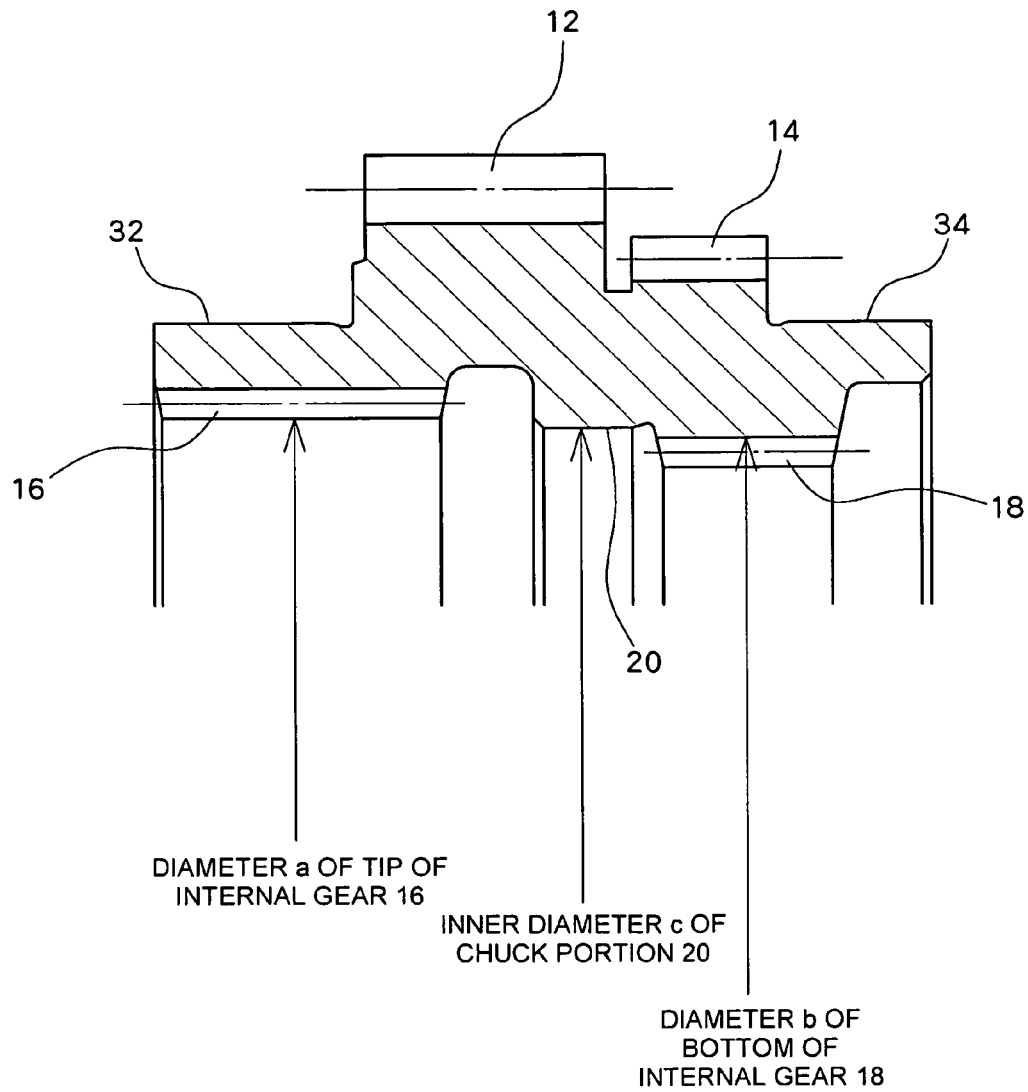
FIG. 2 is a sectional view of the outline of the configuration of the composite gear according to the embodiment of the present invention.

Hereafter, a preferred embodiment of the present invention will be described with reference to the drawings. FIG. 1 and FIG. 2 show the outline of the configuration of the composite gear according to the embodiment of the present invention, wherein FIG. 1 is a sectional view and FIG. 2 is an enlarged view of the encircled portion in FIG. 1. In the composite gear according to the present embodiment, a first external gear 12 and a second external gear 14 are formed on an outer peripheral surface 8 thereof at a predetermined interval in the rotating axis direction and a first internal gear 16 and a second internal gear 18 are formed on an inner peripheral surface 10 thereof at a predetermined interval in the rotating axis direction.

Rotation support surfaces 32, 34 are formed, respectively, on both end portions of the outer peripheral surface 8 outside the first external gear 12 and the second external gear 14 in the rotating axis direction. The composite gear according to the present embodiment is rotatably supported by bearings (not shown) at positions of the rotation support surfaces 32 and 34.

Further, according to the present embodiment, a chuck portion 20 is formed on the inner peripheral surface 10 between the first internal gear 16 and the second internal gear 18. This chuck portion 20 is formed at a position generally on the reverse side of the position where the first external gear 12 is formed. Still further, as shown in FIG. 2, the inner diameter c of the chuck portion 20 is smaller than the diameter a of the tip of the first internal gear 16 and larger than the diameter b of the bottom of the second internal gear 18.

Next, a method of manufacturing the composite gear according to the present embodiment will be described.

Figure 3:
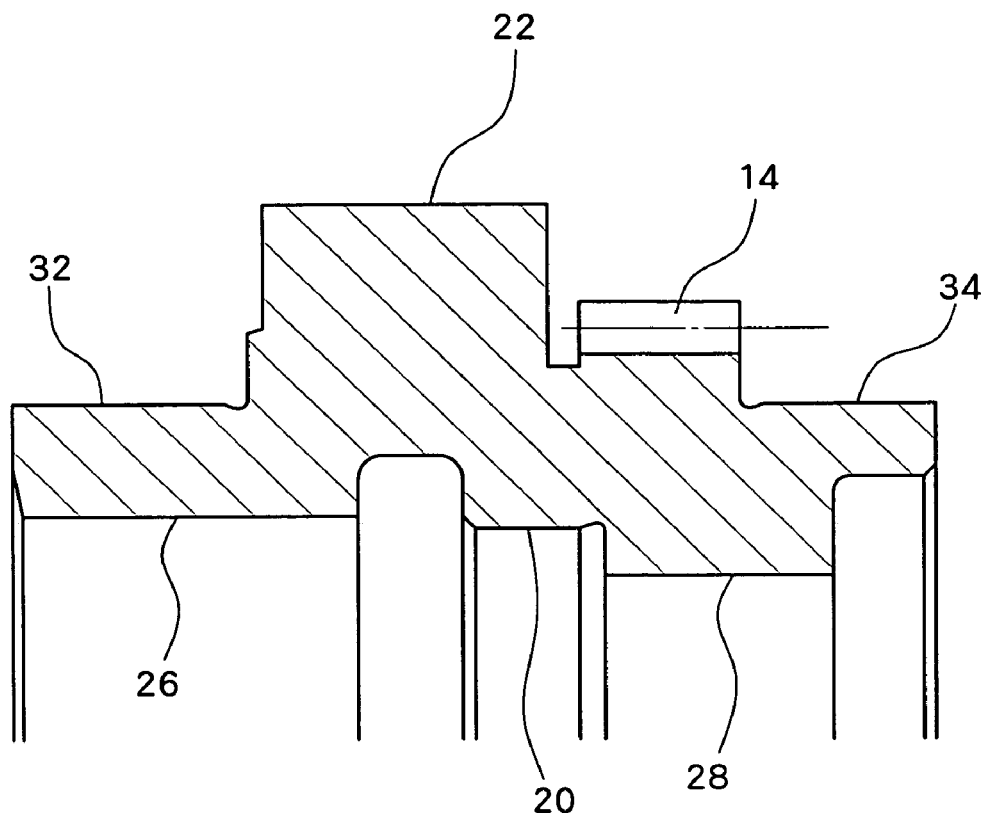
FIG. 3 is a sectional view explaining the method of manufacturing the composite gear according to the embodiment of the present invention.

First, as shown in FIG. 3, the outer peripheral surface 8 and the inner peripheral surface 10 are formed prior to forming the gears 12, 16, and 18. On the outer peripheral surface 8, a first external gear forming surface 22 and the second external gear 14 are formed at a predetermined interval in the rotating axis direction, and the rotation support surfaces 32, 34 before being subjected to finish processing are temporarily formed on both end portions thereof in the rotating axis direction. On the other hand, on the internal peripheral surface 10, a first internal gear forming surface 26 and a second internal gear forming surface 28 are formed at a predetermined interval in the rotating axis direction, and the chuck portion 20 is formed between the first internal gear forming surface 26 and the second internal gear forming surface 28. Here, the inner diameter of the chuck portion 20 is smaller than the inner diameter of the first internal gear forming surface 26 and larger than the inner diameter of the second internal gear forming surface 28. Further, the chuck portion 20 is formed at a position generally on the reverse side of the position where the first external gear forming surface 22 is formed.

It should be noted that FIG. 3 depicts a case where the second external gear 14 is already formed, assuming that the precision is not required for the second external gear 14. However, in the case where precision is required for the second external gear 14, the second external gear 14 is not yet formed at this point. Also, the chuck portion 20 can be formed using known processing methods.

Figure 4:
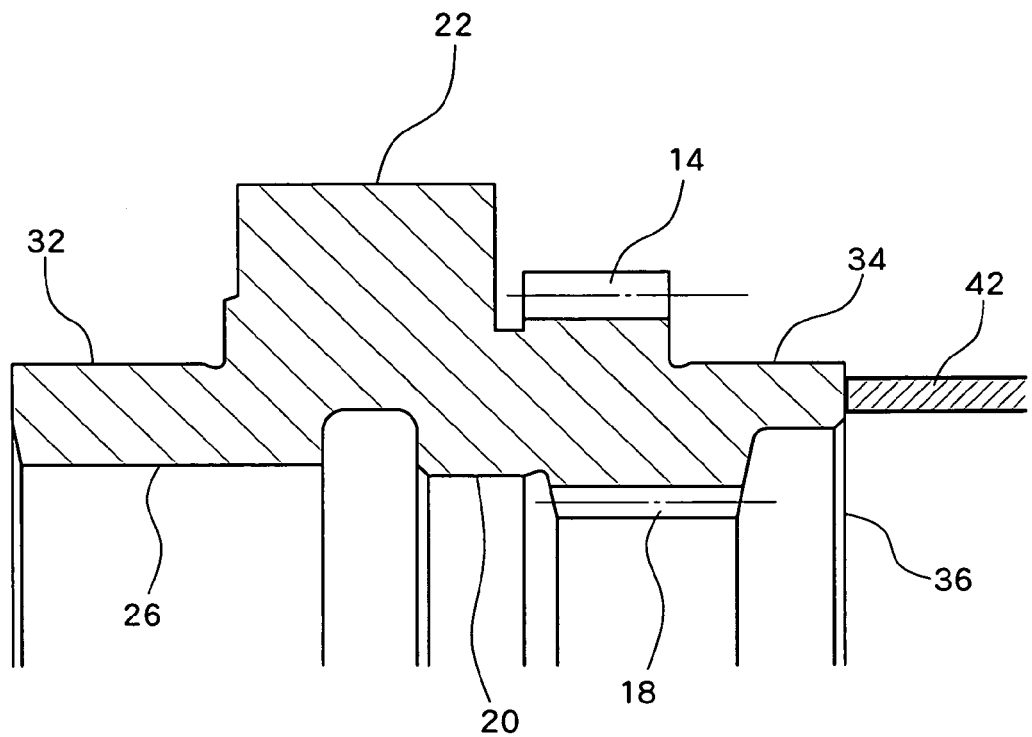
FIG. 4 is a sectional view explaining the method of manufacturing the composite gear according to the embodiment of the present invention.

Next, as shown in FIG. 4, the second internal gear forming surface 28 is processed to form the second internal gear 18. Here, the second internal gear 18 may be formed by broaching. In the present embodiment, the inner diameter of the second internal gear forming surface 28 is smaller than the inner diameters of the chuck portion 20 and the first internal gear forming surface 26, permitting insertion of a broach (not shown) for forming the second internal gear 18 in the rotating axis direction thereby. Further, by forming the second internal gear 18 by broaching, the second internal gear 18 may be formed in a short time and at a high precision. When inserting the broach from the side of the first internal gear forming surface 26 toward the side of the second internal gear forming surface 28, a locating jig 42 is abutted against one end face 36 in the rotating axis direction to locate a workpiece in the rotating axis direction. Also, the broach to be inserted is used to locate the workpiece in the radial direction. After broaching, the second internal gear 18 is subjected to shaving.

Figure 5:
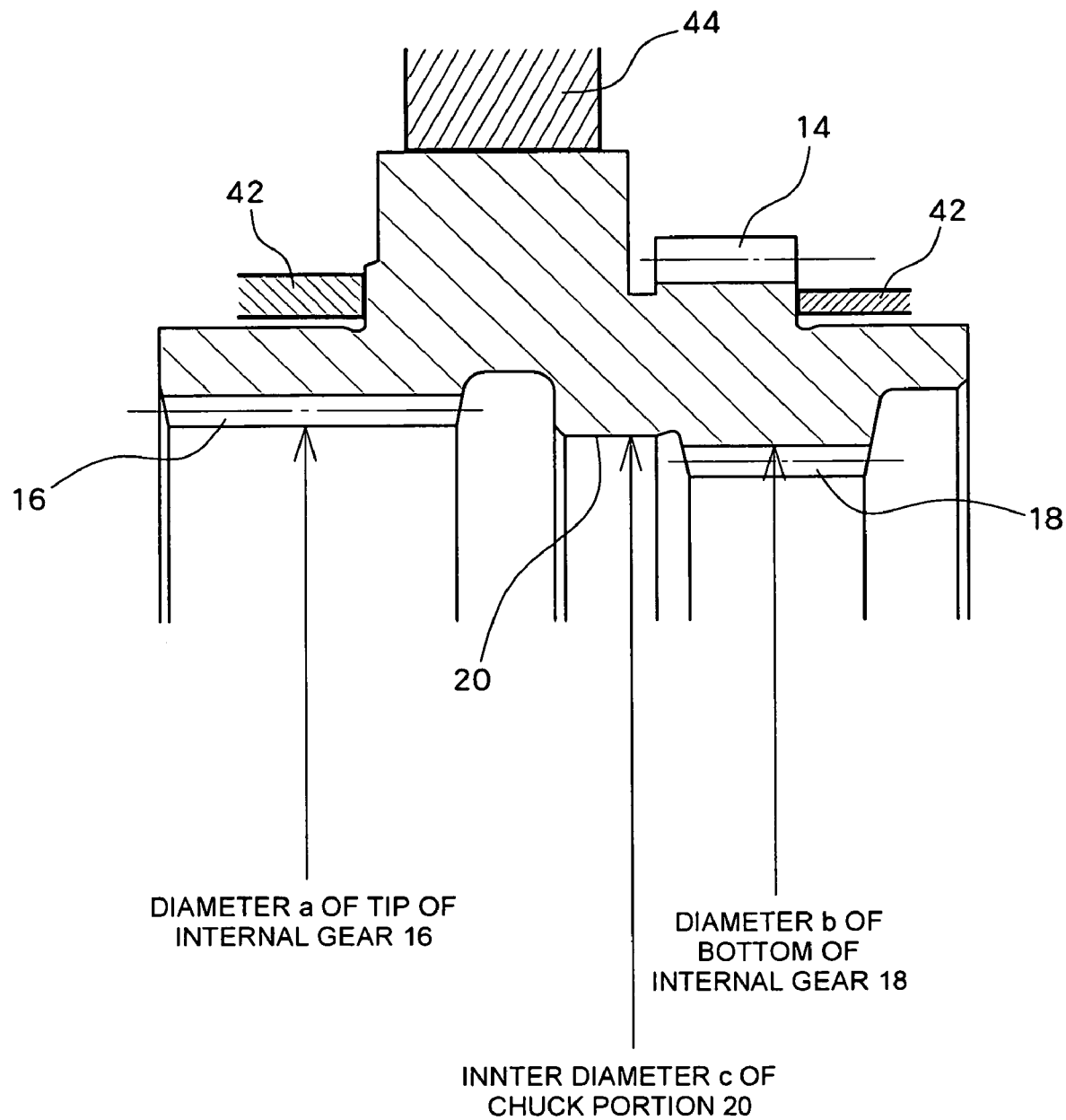
FIG. 5 is a sectional view explaining the method of manufacturing the composite gear according to the embodiment of the present invention.

After forming the second internal gear 18, as shown in FIG. 5, the first internal gear forming surface 26 is processed to form the first internal gear 16. Here, the first internal gear 16 may be formed by known processing methods such as hob machining. At that time, the locating jig 42 is abutted against a surface perpendicular to the rotating axis direction to locate a workpiece in the rotating axis direction. Also, a locating jig 44 is abutted against the first external gear forming surface 22 to locate the workpiece in the radial direction. After machining the first internal gear forming surface 26, the first internal gear 16 is subjected to shaving.

By following the above-mentioned processes, as shown in FIG. 5, the chuck portion 20, the first internal gear 16, and the second internal gear 18 are formed on the inner peripheral surface 10 such that the chuck portion 20 is located between the first internal gear 16 and the second internal gear 18 in the rotating axis direction, and the inner diameter c of the chuck portion 20 is smaller than the diameter a of the tip of the first internal gear 16 and larger than the diameter b of the bottom of the second internal gear 18.

Figure 6:
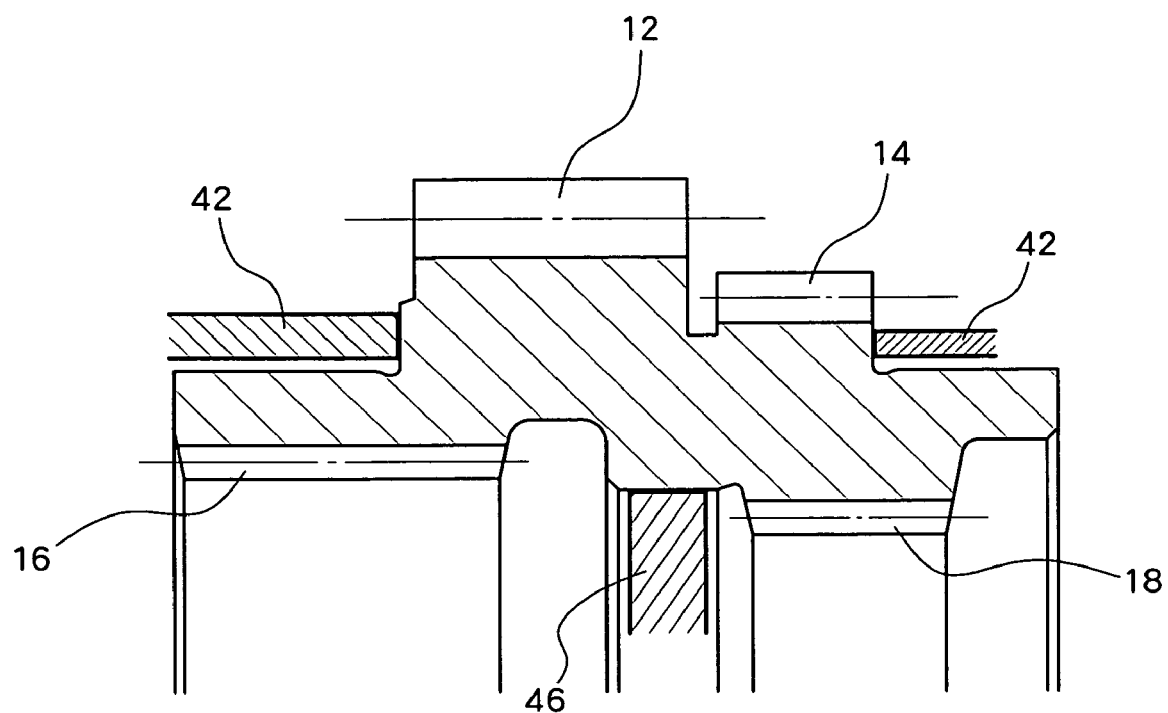
FIG. 6 is a sectional view explaining the method of manufacturing the composite gear according to the embodiment of the present invention.

After forming the chuck portion 20, the first internal gear 16, and the second internal gear 18 on the inner peripheral surface 10, as shown in FIG. 6, the first external gear forming surface 22 is processed to form the first external gear 12. Here, the first external gear 12 may be formed by known processing methods such as hob machining. At that time, the locating jig 42 is abutted against a surface perpendicular to the rotating axis direction to locate a workpiece in the rotating axis direction. Also, a locating jig 46 is abutted against the chuck portion 20 to locate the workpiece in the radial direction. In the present embodiment, the inner diameter c of the chuck portion 20 is smaller than the diameter a of the tip of the first internal gear 16 (inner diameter of the first internal gear forming surface 26), permitting insertion of the locating jig 46 to be abutted against the chuck portion 20 from the side of the first internal gear 16, and thereby allowing the first external gear 12 to be formed with the inside being chucked. After processing the first external gear forming surface 22, the first external gear 12 is subjected to shaving. Then, after forming the first external gear 12, each of the gears 12, 14, 16, and 18 are quenched.

After quenching each of the gears 12, 14, 16, and 18, the rotation support surfaces 32, 34 are ground to finish up the rotation support surfaces 32, 34 which are surfaces rotatably supported by bearings. Here again, the locating jig 46 to be abutted against the chuck portion 20 can be inserted from the side of the first internal gear 16, allowing finish processing of the rotation support surfaces 32, 34 to be carried out with the inside being chucked. The composite gear according to the present embodiment may be obtained based on the steps described above.

Further, in the description above, while description has been given for the case where the first internal gear 16 is formed after the second internal gear 18 is formed, the second internal gear 18 may be formed after the first internal gear 16 is formed. Also, in the case where the precision of the second external gear 14 is required, the second external gear 14 is formed after forming either the first internal gear 16 or the first external gear 12. At that time as well, the locating jig 46 to be abutted against the chuck portion 20 can be inserted from the side of the first internal gear 16, thereby allowing the second external gear 14 to be formed with the inside being chucked.

As described above, in the present embodiment, the inner diameter c of the chuck portion 20 is smaller than the diameter a of the tip of the first internal gear 16 (inner diameter of the first internal gear forming surface 26), permitting the locating jig 46 to be inserted from the side of the first internal gear 16 and abutted against the chuck portion 20, thereby allowing the first external gear 12 to be formed and the finish processing of the rotation support surface 32, 34 to be carried out with the inner diameter being chucked. Accordingly, the first external gear 12 may be formed without chucking the outside at the rotation support surfaces 32, 34 on the outer peripheral surface 8, and thus the datum for locating a workpiece during forming of the first external gear 12 and that used during finish processing of the rotation support surface 32, 34 do not differ. Therefore, according to the present embodiment, the precision of the first external gear 12 may be improved. Further, since the first external gear 12 may be formed with the inside being chucked, interference of cutting tools with the locating jig during formation of the first external gear 12 can be reliably prevented.

Still further, in the present embodiment, the inner diameter c of the chuck portion 20 is larger than the diameter b of the bottom of the second internal gear 18, permitting the second internal gear 18 to be formed by broaching, thereby improving the precision of the second internal gear 18. Also, the time required to form the second internal gear 18 may be reduced.

In the above description, explanation has been given on a case where the inner diameter c of the chuck portion 20 is smaller than the diameter a of the tip of the first internal gear 16 and larger than the diameter b of the bottom of the second internal gear 18. However, since it is possible to cause the locating jig 46 to be abutted against the chuck portion 20 even in the case where the inner diameter c of the chuck portion c is smaller than at least one of the diameter of the tip of the first internal gear 16 and the diameter of the tip of the second internal gear 18, the first external gear 12 may be formed and the finish processing of the rotation support surfaces 32, 34 may be carried out with the inside being chucked in such a case as well. Accordingly, in that case also, the precision of the first external gear 12 may be improved. In that case, the chuck portion 20, the first internal gear forming surface 26, and the second internal gear forming surface 28 are formed on the inner peripheral surface 10 such that the inner diameter of the chuck portion 20 is smaller than at least one of the inner diameter of the first internal gear forming surface 26 and the inner diameter of second internal gear forming surface 28. As a result, the chuck portion 20, the first internal gear 16, and the second internal gear 18 are formed on the inner peripheral surface 10 such that the inner diameter of the chuck portion 20 is smaller than at least one of the diameter of the tip of the first internal gear 16 and the diameter of the tip of the second internal gear 18. Also, the second internal gear 18 may be formed by know processing methods such as hob machining.

Further, in the above description, explanation has been given for a case where the first external gear 12 and the second external gear 14 are formed on the outer peripheral surface 8 at the predetermined interval in the rotating axis direction. However, the present invention is applicable to the case where only the first external gear 12 is formed on the outer periperal surface 8, and the present invention is applicable regardless of the number of external gears formed on the outer peripheral surface 8.

As mentioned above, while description has been given in regard to the mode for carrying out the present invention, it is obvious that the present invention is not limited to such an embodiment in any way and that the present invention may be implemented in various forms without departing from the scope of the present invention.

The invention claimed is:

1. A composite gear wherein an external gear and a rotation support surface are formed on an outer peripheral surface thereof and a first internal gear and a second internal gear are formed on an inner peripheral surface thereof at a predetermined interval in the rotating axis direction, wherein:

a chuck portion is formed on the inner peripheral surface between the first internal gear and the second internal gear, and an inner diameter of the chuck portion is smaller than the diameter of the tip of the first internal gear and larger than the diameter of the bottom of the second internal gear.

2. A method of manufacturing the composite gear as claimed in claim 1, comprising:

processing the inner peripheral surface to form the chuck portion is located and the second internal gear on the inner peripheral surface such that the chuck portion is located between the first internal gear and the second internal gear in the rotating axis direction and the inner diameter of the chuck portion is smaller than at least one of the diameter of the tip of the first internal gear and the diameter of the tip of the second internal gear, processing the external gear with the chuck portion being chucked, and processing a rotation support surface with the chuck portion being chucked.

wherein the processing the inner peripheral surface is a process in which the chuck portion, the first internal gear, and the second internal gear are formed on the inner peripheral surface such that the inner diameter of the chuck portion is smaller than the diameter of the tip of the first internal gear larger than the diameter of the bottom of the second internal gear.

* * * * *

UNITED STATES PATENT AND TRADEMARK OFFICE
CERTIFICATE OF CORRECTION

PATENT NO. : 7,628,091 B2
APPLICATION NO. : 10/590233
DATED : December 8, 2009
INVENTOR(S) : Yota Mizuno et al.

It is certified that error appears in the above-identified patent and that said Letters Patent is hereby corrected as shown below:

On the Title Page: In the Abstract, line 2, change "Support" to --support--.

| Column | Line | |
|---|---|---|
| 1 | 48 | Change "gears" to --gear--. |
| 2 | 41 | After "according" insert --to--. |
| 6 | 8 | After "formed by" change "know" to --known--. |
| 6 | 40 | Change "portion" to --portion,--, delete "is located" and insert --the first internal gear,--. |
| 6 | 49 | Change "chucked." to --chucked,--. |
| 6 | 55 | After "gear" insert --and--. |

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,628,091 B2  Page 1 of 1
APPLICATION NO. : 10/590233
DATED : December 8, 2009
INVENTOR(S) : Yota Mizuno et al.

It is certified that error appears in the above-identified patent and that said Letters Patent is hereby corrected as shown below:

Title page (*) Notice

Delete "by 499 days" – and insert --by 607 days--

Signed and Sealed this

Twenty-fourth Day of August, 2010

David J. Kappos
*Director of the United States Patent and Trademark Office*